United States Patent [19]

Tanahashi

[11] 4,175,531

[45] Nov. 27, 1979

[54] INTERNAL COMBUSTION ENGINE WITH AN AUXILIARY COMBUSTION CHAMBER

[75] Inventor: Toshio Tanahashi, Toyota, Japan

[73] Assignee: Toyota Jidosha Kogyo Kabushiki Kaisha, Aichi, Japan

[21] Appl. No.: 781,423

[22] Filed: Mar. 25, 1977

[30] Foreign Application Priority Data

Apr. 12, 1976 [JP] Japan .................... 51-40405

[51] Int. Cl.² .......................................... F02B 19/00
[52] U.S. Cl. ........................ 123/191 S; 123/32 SP; 123/32 ST; 123/193 P
[58] Field of Search ........... 123/32 ST, 32 SP, 191 S, 123/193 CH, 193 H, 193 P, 191 SP, 32 B, 33 D, 32 L

[56] References Cited

U.S. PATENT DOCUMENTS

| | | | |
|---|---|---|---|
| 1,782,395 | 11/1930 | Bullington | 123/191 SP |
| 1,877,737 | 9/1932 | Goldberg | 123/32 L |
| 3,092,087 | 6/1963 | Holt et al. | 123/32 B |
| 3,923,015 | 12/1975 | Mukai et al. | 123/191 S |
| 3,924,582 | 12/1975 | Yagi et al. | 123/32 ST |
| 3,980,057 | 9/1976 | Sanda et al. | 123/32 SP |
| 4,060,059 | 11/1977 | Blaser | 123/193 P |

FOREIGN PATENT DOCUMENTS

| | | | |
|---|---|---|---|
| 1009362 | 5/1952 | France | 123/191 SP |
| 702346 | 2/1941 | Fed. Rep. of Germany | 123/33 D |
| 872883 | 4/1953 | German Democratic Rep. | 123/32 B |

*Primary Examiner*—Charles J. Myhre
*Assistant Examiner*—Andrew M. Dolinar
*Attorney, Agent, or Firm*—Stevens, Davis, Miller & Mosher

[57] ABSTRACT

Disclosed is an internal combustion engine comprising a main combustion chamber, a first auxiliary combustion chamber and a second auxiliary combustion chamber. The first auxiliary combustion chamber is connected to the main combustion chamber via a first connecting passage in which the spark plug is located. The second auxiliary combustion chamber having no spark plug is connected to the main combustion chamber via a second connecting passage. A flame of the combustible mixture contained in the first connecting passage and ignited by the spark plug reaches the second connecting passage and causes the ignition of the combustible mixture in the second auxiliary combustion chamber. As a result a burning jet is injected from the second connecting passage into the main combustion chamber a little while after the burning jet is injected from the first connecting passage into the main combustion chamber.

6 Claims, 9 Drawing Figures

INTERNAL COMBUSTION ENGINE WITH AN AUXILIARY COMBUSTION CHAMBER

DESCRIPTION OF THE INVENTION

The present invention relates to an internal combustion engine with an auxiliary combustion chamber.

There has been known an internal combustion engine with an auxiliary combustion chamber in which the combustion chamber comprises a main combustion and an auxiliary combustion chamber which are interconnected with each other via at least one connecting passage, the spark gap of a spark plug being located in the connecting passage or in the auxiliary combustion chamber. The combustible mixture in the auxiliary combustion chamber is ignited by the spark plug and, then, the burning jet is injected into the main combustion chamber from the connecting passage.

In a majority of internal combustion engines of this type, a lean air-fuel mixture is introduced into the main combustion chamber, and this lean air-fuel mixture is rapidly burned by the burning jet injected into the main combustion chamber from the auxiliary combustion chamber. Since the flame speed of a lean air-fuel mixture in itself is very low, the speed of combustion of the lean air-fuel mixture in the main combustion chamber is quickened by using the injection of the burning jet as mentioned above. However, in this engine, the combustion speed of the lean air-fuel mixture sufficient to obtain a good combustion can not be obtained. Consequently, in order to further quicken the combustion speed of the lean air-fuel mixture in the main combustion chamber, there has been proposed an internal combustion engine in which turbulence is caused in the main combustion chamber by using a squish flow. However, in this engine, since the flame can not spread into the squish flow and the ratio of the area of the inner wall defining the main combustion chamber to the volume of the main combustion chamber is increased, there occurs a problem in that the amount of harmful HC components produced is increased. Consequently, in order to eliminate the above problem, it is necessary for the ignition timing to be retarded so as to increase the temperature of the exhaust gas, thereby promoting a secondary oxidation of harmful HC components in the exhaust system of the engine. However, if the ignition timing is retarded, the torque of the engine is reduced. Therefore, the use of the squish flow scarcely has any merits.

In addition, in order to quicken the speed of combustion, there has been proposed an internal combustion engine in which a strong burning jet is injected into the main combustion chamber from the auxiliary combustion chamber. However, in this engine, the burning jet can not extend over the entire space of the main combustion chamber and, as a result, there is a disadvantage in that a relatively large amount of harmful HC components is produced.

Furthermore, there has been proposed an internal combustion engine in which a plurality of connecting passages are provided and the burning jets are injected from the connecting passages in directions different from each other. However, in this engine, since the combustible mixture in the auxiliary combustion chamber is ignited by the single spark plug located in one of the connecting passages, when the pressure in the auxiliary combustion chamber is elevated after ignition, the unburned mixture in the auxiliary combustion chamber is pushed out into the main combustion chamber via the remaining connecting passages. This results in a disadvantage in that the strength of the burning jet is weakened, whereby a relatively large amount of harmful HC components is produced.

An object of the present invention is to provide an internal combustion engine with an auxiliary combustion chamber which has a novel construction, and which is capable of quickening the speed of the combustion of the combustible mixture in the main combustion chamber and capable of reducing the amount of harmful HC components in the exhaust gas.

According to the present invention, there is provided an internal combustion engine comprising: a cylinder block having a cylinder bore therein; a cylinder head mounted on said cylinder block; a piston reciprocally movable in said cylinder bore; said cylinder head and said piston having an inner wall defining a main combustion chamber; an intake valve movably mounted on said cylinder head for feeding a combustible mixture into said main combustion chamber; an exhaust valve movably mounted on said cylinder head for discharging the exhaust gas from said main combustion chamber, said cylinder head having therein a first bore defining a first auxiliary combustion chamber and at least one first connecting passage communicating said first auxiliary combustion chamber with said main combustion chamber; and, a spark plug having a spark gap located in said first bore, said inner wall of said cylinder head and of said piston having therein a second bore defining a second auxiliary combustion chamber, and a second connecting passage which communicates said second auxiliary combustion chamber with said main combustion chamber and opens into said main combustion chamber at a position near the position at which said first connecting passage opens into said main combustion chamber.

The present invention may be more fully understood from the following description of preferred embodiments of the invention, together with the accompanying drawings.

DESCRIPTION OF PREFERRED EMBODIMENTS

Figure 1:
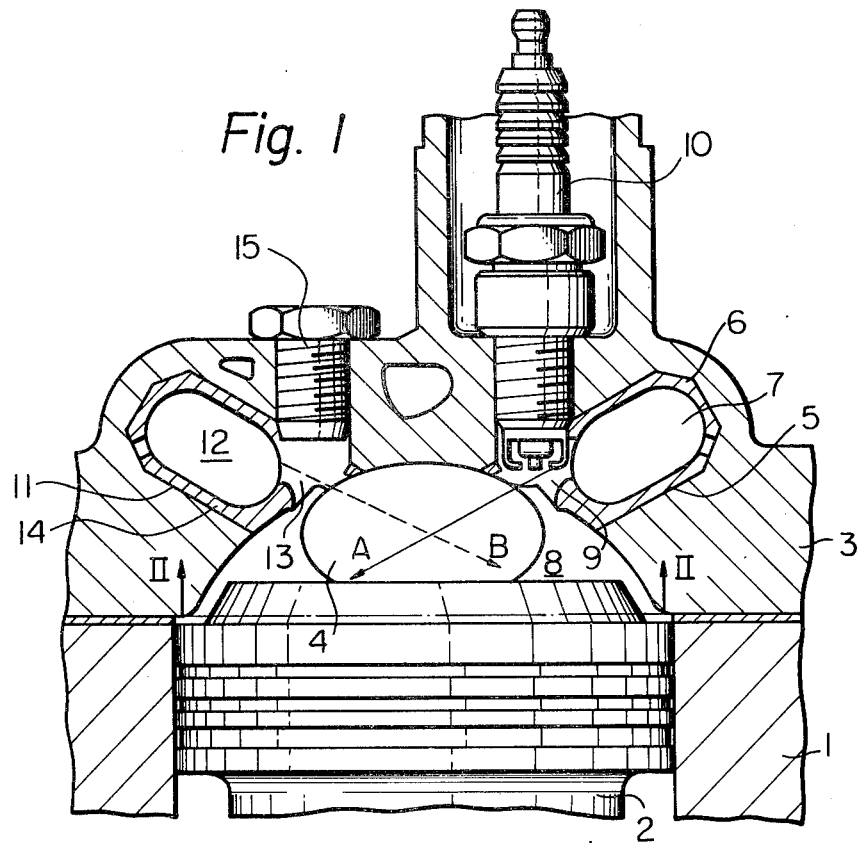
FIG. 1 is a cross-sectional side view of an embodiment of an internal combustion engine according to the present invention.

Referring to FIG. 1, an internal combustion engine with an auxiliary combustion chamber comprises a cylinder block 1, a piston 2, a cylinder head 3, an intake valve 4, an exhaust valve 4' (FIG. 2), and an auxiliary chamber component 6 press-fitted into recess 5 formed in the cylinder head 3. An auxiliary combustion chamber 7 and a connecting passage 9, communicating the auxiliary combustion chamber 7 with a main combustion chamber 8, are formed in the auxiliary chamber component 6. The spark gap of a spark plug 10 is located in the connecting passage 9. According to the present invention, another recess 11 is further formed in the cylinder head 3, and another auxiliary chamber component 14 forming an auxiliary combustion chamber 12 and a connecting passage 13 therein is press-fitted into the recess 11. Dislocation of this auxiliary chamber component 14 is prevented by means of, for example, a bolt 15 screwed into the cylinder head 3. As is shown in FIG. 1, the openings of the connecting passages 9 and 13 are directed toward the central portion of the top surface of the piston 2. In addition, as is shown in FIG. 1, it is preferable that the connecting passages 9 and 13 be so arranged that the axis of the connecting passage 9 intersects the axis of the connecting passage 13. However, as is shown by the broken line in FIG. 2, instead of providing the connecting passages 9 and 13, connecting passages 16 and 17 may be arranged so that the axis of the connecting passage 16 is located at a skew position with respect to the axis of the connecting passage 17.

An internal combustion engine according to the present invention is operated as follows.

At the time of the intake stroke, a lean air-fuel mixture, or a mixture containing a recirculated exhaust gas therein, is introduced into the main combustion chamber 8 via the intake valve 4. Then, at the time of the compression stroke, the combustible mixture in the main combustion chamber 8 is forced into the auxiliary combustion chambers 7 and 12 via the connecting passages 9 and 13. This forcing of the mixture into the chambers 7 and 12 is accompanied by a strong turbulence which is caused when the mixture passes through the connecting passages 9 and 13. At the end of the compression stroke, the combustible mixture in the connecting passage 9 is ignited and, thus, the flame spreads into the auxiliary combustion chamber 7. A part of the flame begins to spread into the main combustion chamber 8 from the connecting passage 9 and reaches the connecting passage 13 located near the connecting passage 9 before the flame fully spreads over the entire space of the auxiliary combustion chamber 7. The pressure in the auxiliary combustion chamber 7 is rapidly elevated and, as a result, a burning jet is injected into the main combustion chamber 8 from the connecting passage 9 in the direction A, as shown in FIG. 1, before the flame fully spreads over the entire space of the auxiliary combustion chamber 12. Then, the pressure in the auxiliary combustion chamber 12 is rapidly elevated and, as a result, a burning jet is injected into the main combustion chamber 8 from the connecting passage 13 in the direction B, as shown in FIG. 1.

The whole combustible mixture in the main combustion chamber 8 is fully mixed by the burning jet injected towards the direction A and by the burning jet injected towards the direction B a little while after the burning jet is injected towards the direction A. As a result of this, turbulent burning is caused in the main combustion chamber 8. As mentioned above, since two burning jets are injected at an interval to each other, the burning jets do not come into violent contact with each other. Therefore, the burning jets can spread over the entire space of the main combustion chamber 8. As a result of this, the whole combustible mixture in the main combustion chamber 8 can be rapidly burned, thereby reducing the amount of harmful HC components produced and improving combustion efficiency.

Figure 2:
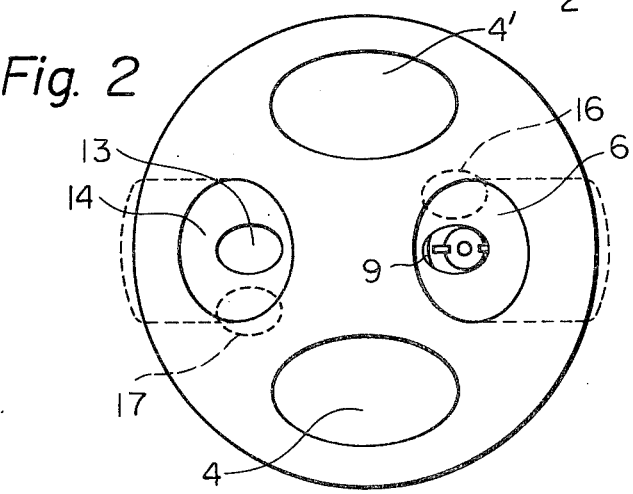
FIG. 2 is a view taken along the line II—II in FIG. 1.
Figure 3:
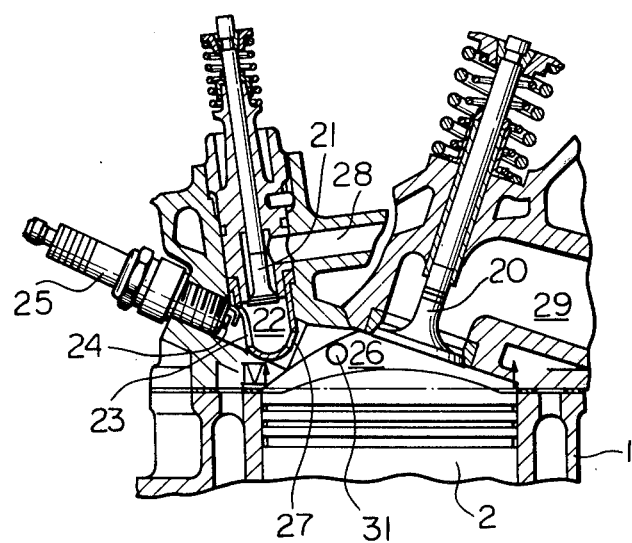
FIG. 3 is a cross-sectional side view of another embodiment according to the present invention.
Figure 4:
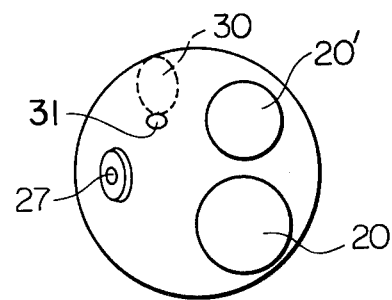
FIG. 4 is a view taken along the line IV—IV in FIG. 3.

While the embodiment shown in FIGS. 1 and 2 shows the case wherein the present invention is applied to an internal combustion engine with an auxiliary combustion chamber in which a lean air-fuel mixture, or a mixture containing recirculated exhaust gas therein, is burned, the present invention can be applied to an internal combustion engines with an auxiliary combustion chamber of any other type. FIGS. 3 and 4 show the case wherein the present invention is applied to an internal combustion engine with an auxiliary combustion chamber of another type, in which a secondary intake valve 21 is provided in addition to a primary intake valve 20. Referring to FIGS. 3 and 4, this internal combustion engine comprises an exhaust valve 20', an auxiliary combustion chamber 22, a spark plug 25 having a spark gap 24 exposed to the auxiliary combustion chamber 22 via an opening 23, a connecting passage 27 communicating the auxiliary combustion chamber 22 with the main combustion chamber 26, a rich air-fuel mixture supply passage 28 connected to a rich air-fuel mixture forming system (not shown), and an intake port 29 connected to a lean air-fuel mixture forming system (not shown). In this embodiment, the exhaust gas may be recirculated into the rich air-fuel mixture passage 28 and into the intake port 29.

In the internal combustion engine shown in FIGS. 3 and 4, at the time of the intake stroke, a lean air-fuel mixture is introduced into the main combustion chamber 26 via the intake port 29 and the primary intake valve 20 and, on the other hand, a rich air-fuel mixture is introduced into the auxiliary combustion chamber 22 via the rich air-fuel mixture supply passage 28 and the secondary intake valve 21. The rich air-fuel mixture introduced into the auxiliary combustion chamber 22 is ignited by the spark plug 25 and, as a result, a burning jet is injected into the main combustion chamber 26 from the connecting passage 27, whereby the lean air-fuel mixture in the main combustion chamber 26 is ignited by the burning jet. In this embodiment, as is shown in FIGS. 3 and 4, an auxiliary combustion chamber 30 is formed in the cylinder head 3. This auxiliary combustion chamber 30 is connected to the main combustion chamber 26 via a connecting passage 31 opening into the main combustion chamber 26 at a position near the connecting passage 27. In this engine, similar to the embodiment shown in FIGS. 1 and 2, the lean air-fuel mixture in the auxiliary combustion chamber 30 is ignited by the flame of the rich air-fuel mixture ignited in the auxiliary combustion chamber 22. Consequently, the burning jet is injected into the main combustion chamber 26 from the auxiliary combustion chamber 30 via the connecting passage 31 a little while after the burning jet is injected into the main combustion chamber 26 from the auxiliary combustion chamber 22 via the connecting passage 27.

Figure 5:
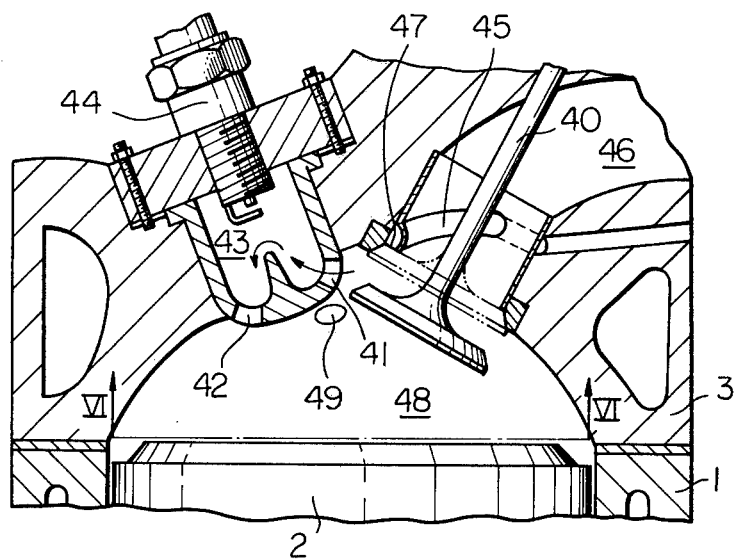
FIG. 5 is a cross-sectional side view of a further embodiment according to the present invention.
Figure 6:
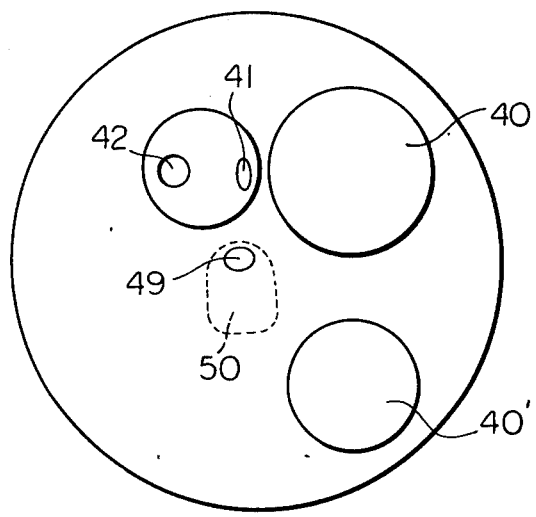
FIG. 6 is a view taken along the line VI—VI in FIG. 5.

FIGS. 5 and 6 show the case wherein the present invention is applied to an internal combustion engine with an auxiliary combustion chamber of a further type.

The internal combustion engine shown in FIGS. 5 and 6 comprises an intake valve 40, an exhaust valve 40', an auxiliary combustion chamber 43 having a pair of connecting passages 41 and 42, a spark plug 44 disposed in the auxiliary combustion chamber 43, a rich air-fuel mixture supply passage 45 connected to a rich air-fuel mixture forming system (not shown), and an intake port 46 connected to a lean air-fuel mixture forming system (not shown). In this embodiment, the exhaust gas may be recirculated into the rich air-fuel mixture supply passage 45 and into the intake port 46. The open end 47 of the rich air-fuel mixture supply passage 45 is closed by the intake valve 40 when the intake valve 40 is in the position shown by the two dot-dash line in FIG. 5, while the open end 47 opens into the main combustion chamber 48 when the intake valve 40 is opened as is shown by the solid line in FIG. 5. In this engine, at the time of the intake stroke, a lean air-fuel mixture is introduced into the main combustion chamber 48 via the intake port 46. At the same time, a rich air-fuel mixture is sucked out from the open end 47 of the rich air-fuel mixture supply passage 45 and, then, the rich air-fuel mixture stream is deflected by the valve head of the intake valve 40. As a result of this, the rich air-fuel mixture is introduced into the auxiliary combustion chamber 43 via the connecting passage 41 as shown by an arrow in FIG. 5. Then, the rich air-fuel mixture introduced into the auxiliary combustion chamber 43 is ignited by the spark plug 44 and, as a result, burning jets are injected into the main combustion chamber 48 from the connecting passages 41 and 42, whereby the lean air-fuel mixture in the mian combustion chamber 48 is ignited by the burning jets. In this embodiment; similar to the embodiments shown in FIGS. 1 and 2, an auxiliary combustion chamber 50 is formed in the cylinder head 3. This auxiliary combustion chamber 50 is connected to the main combustion chamber 48 via a connecting passage 49 opening into the main combustion chamber 48 at a position near the connecting passage 41 or 42. In this engine, similar to the embodiment shown in FIGS. 1 and 2, the lean air-fuel mixture in the auxiliary combustion chamber 50 is ignited by the flame of the rich air-fuel mixture ignited in the auxiliary combustion chamber 43. Consequently, a burning jet is injected into the main combustion chamber 48 from the auxiliary combustion chamber 50 via the connecting passage 49 a little while after the burning jet is injected into the main combustion chamber 48 from the auxiliary combustion chamber 43 via the connecting passages 41 and 42.

Figure 7:
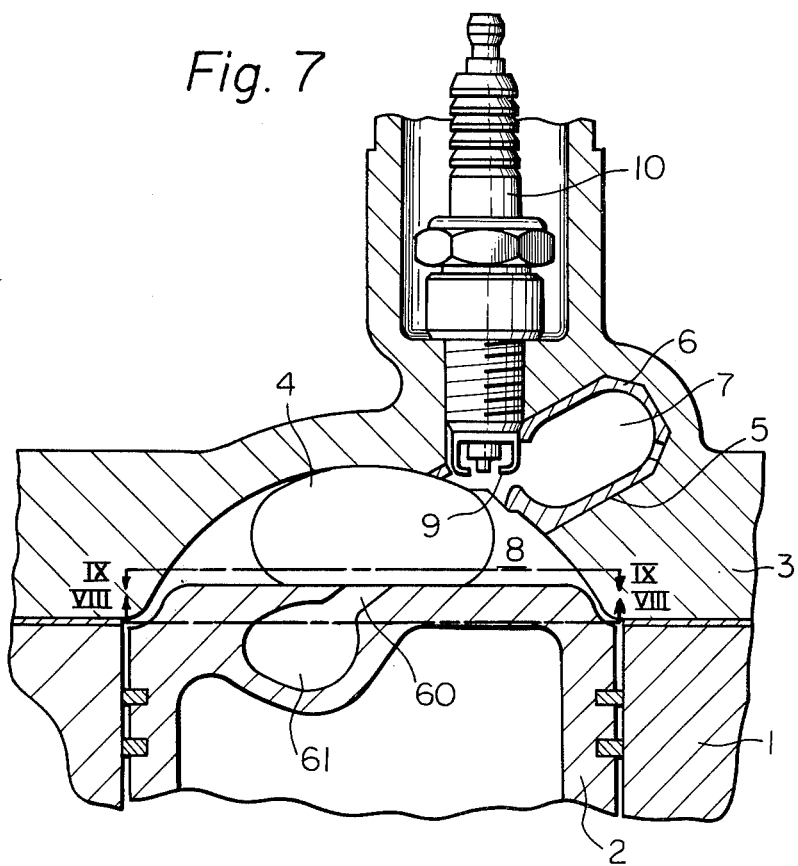
FIG. 7 is a cross-sectional view of a still further embodiment according to the present invention.
Figure 8:
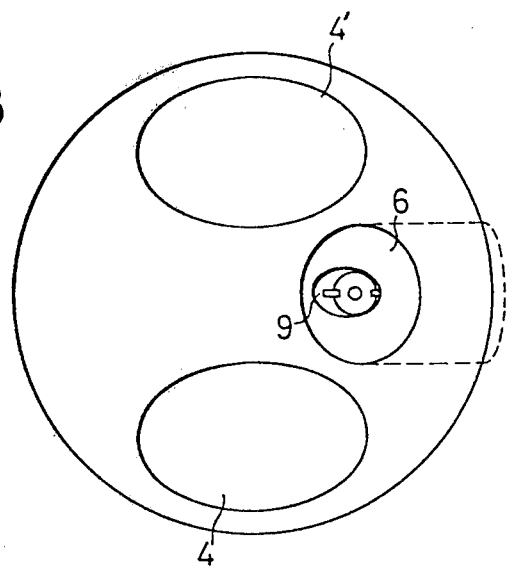
FIG. 8 is a cross-sectional view taken along line VIII—VIII of FIG. 7 but not showing the piston head for clarity.
Figure 9:
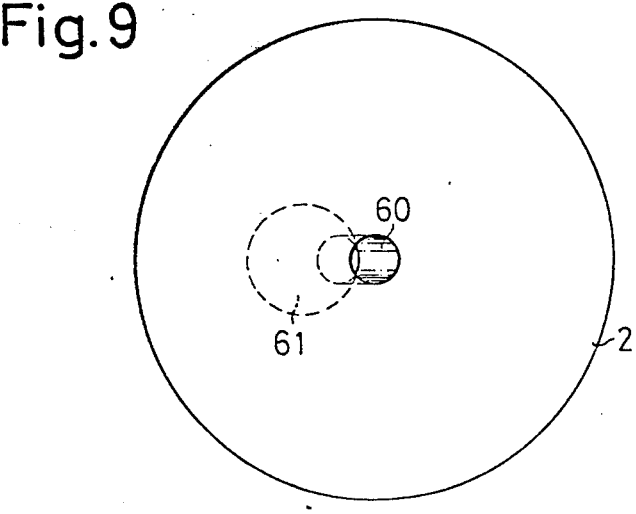
FIG. 9 is a cross-sectional view taken along line IX—IX of FIG. 7 but not showing the cylinder head for clarity.

FIG. 7 shows a still further embodiment according to the present invention. In FIG. 7, similar components are indicated with the same reference numerals as used in FIG. 1. Referring to FIG. 7, another auxiliary combustion chamber 61 is formed in the piston 2. This auxiliary combustion chamber 61 is connected to the main combustion chamber 8 via a connecting passage 60. In this embodiment, it is preferable that the connecting passage 60 be so arranged that the axis of the connecting passage 9 and the axis of the connecting passage 60 are common to or parallel with each other. However, the connecting passage 60 may be arranged so that the axis of the connecting passage 60 is arranged perpendicular to the top surface of the piston 2. In addition, in this engine, similar to the embodiment shown in FIGS. 1 and 2, a burning jet is injected from the auxiliary combustion chamber 61 into the main combustion chamber 8 via the connecting passage 60 a little while after the burning jet is injected from the auxiliary combustion chamber 7 into the main combustion chamber 8 via the connecting passage 9. Furthermore, in the embodiments shown in FIGS. 3 and 5, instead of forming the auxiliary combustion chambers 30 and 50 in the cylinder head, the auxiliary combustion chamber having no spark plug can be formed in the piston as shown in FIG. 7.

As will be understood from the description hereinbefore presented, the principal feature of the present invention is to delay the starting time of the injection of the burning jet injected from the auxiliary combustion chamber having no spark plug relative to the starting time of the injection of the burning jet injected from the auxiliary combustion chamber having the spark plug. Consequently, in the embodiments shown in FIGS. 1 through 7, it is possible that another spark plug is disposed in the auxiliary combustion chambers 12, 30, 50, 61 or in the connecting passages 13, 29, 49, 60, and the ignition timing of the other spark plugs is retarded relative to that of the spark plugs 10, 25, 44. In addition, the time difference between the starting time of the burning jet injected from the auxiliary combustion chambers 12, 30, 50, 61 and the starting time of the burning jet injected from the auxiliary combustion chambers 7, 22, 43 can be regulated by changing the ratio of the volume of the auxiliary combustion chambers 12, 30, 50, 61 to the volume of the auxiliary combustion chambers 7, 22, 43.

According to the present invention, since the strong burning jets are injected into the main combustion chamber over its entire space, the combustible mixture in the main combustion chamber can be rapidly burned, that is, the speed of the combustion of the combustible mixture in the main combustion chamber can be quickened. As a result of this, the amount of harmful HC components produced can be reduced and the combustion efficiency can be extremely improved. Needless to say, the present invention can be applied to an internal combustion engine using a mixture of an ordinary air-fuel ratio.

While the invention has been described with reference to specific embodiments chosen for purposes of illustration, it should be apparent that numerous modifications could be made thereto by those skilled in the art without departing from the spirit and scope of the invention.

What is claimed is:
1. An internal combustion engine comprising:
a cylinder block having a cylinder bore therein;
a cylinder head on said cylinder block;
a piston reciprocally movable in said cylinder bore, said piston and said cylinder head defining a large main combustion chamber therebetwen when said piston is in its top dead center position;
an intake valve movably mounted on said cylinder head through which a combustible mixture is fed into said main combustion chamber;
an exhaust valve movably mounted on said cylinder head through which exhaust gas is discharged from said main combustion chamber;
means defining a first auxiliary combustion chamber in said cylinder head;
a first passage directly fluidly communicating said first auxiliary combustion chamber and said main combustion chamber, said first passage extending obliquely relative to the axis of said piston is a direction downward and toward one side of the main combustion chamber;
means defining a second auxiliary combustion chamber in said piston;

a single second passage in said piston directly fluidly communicating said second auxiliary combustion chamber and said main combustion chamber, said second passage opening into said main combustion chamber at a position near the position at which the first passage opens into said main combustion chamber, said second passage also extending obliquely to the axis of the piston in a direction upward and toward a side of the main combustion chamber opposite said one side and having an axis substantially parallel to the axis of the first passage; and a spark plug having a spark gap in one of said first passage and said first auxiliary combustion chamber, said second passage and said second auxiliary combustion chamber not having a spark gap of a spark plug therein.

2. An internal combustion engine as claimed in claim 1, wherein said first auxiliary combustion chamber is connected only to said main combustion chamber, the spark gap of said spark plug being located in said first connecting passage.

3. An internal combustion engine as claimed in claim 2, wherein said combustible mixture is a lean air-fuel mixture.

4. An internal combustion engine as claimed in claim 2, wherein said combustible mixture is an air-fuel mixture containing the recirculated exhaust gas therein.

5. An internal combustion engine as claimed in claim 1, wherein the axis of said first connecting passage and the axis of said second connecting passage are common to each other.

6. An internal combustion engine as claimed in claim 1, wherein:
one end of said second passage which opens directly into said main combustion is substantially centrally disposed on the top of said piston.

* * * * *